Sept. 23, 1958  W. D. ALLISON  2,853,310
LOAD COMPENSATING SPRING SUSPENSION FOR MOTOR VEHICLES
Filed March 1, 1954  3 Sheets-Sheet 2
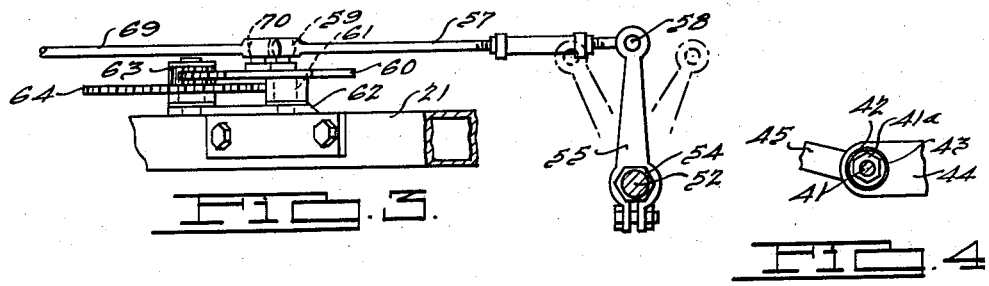
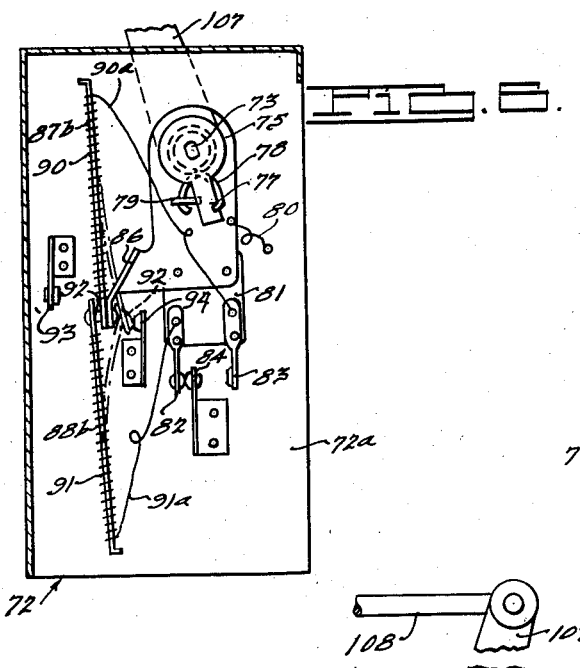
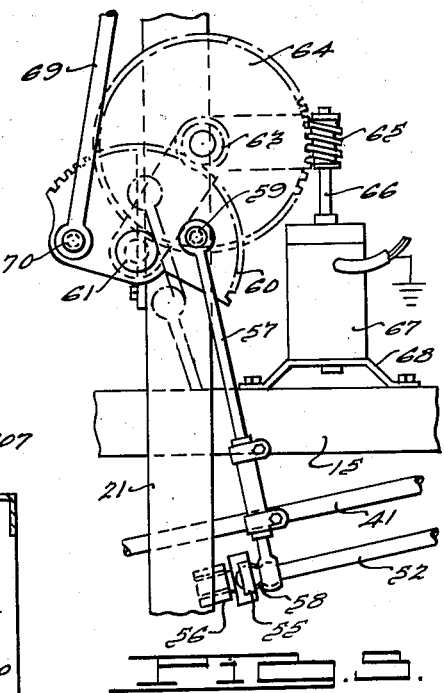
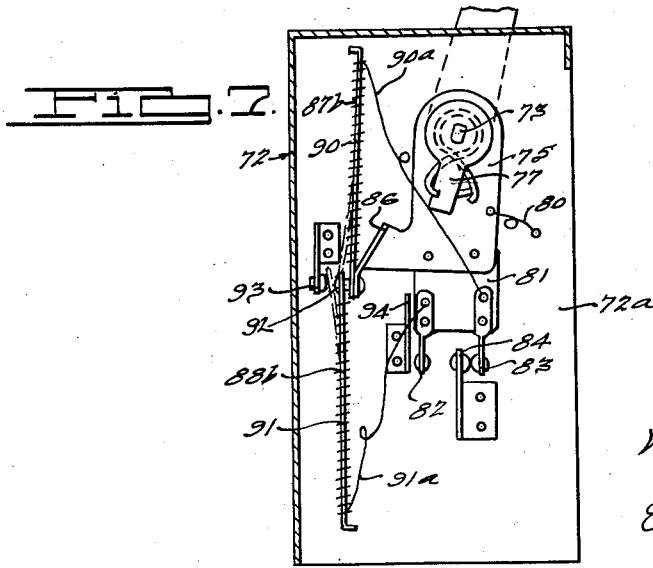
INVENTOR.
William D. Allison.
BY
Elmer Jamison Gray
ATTORNEY.

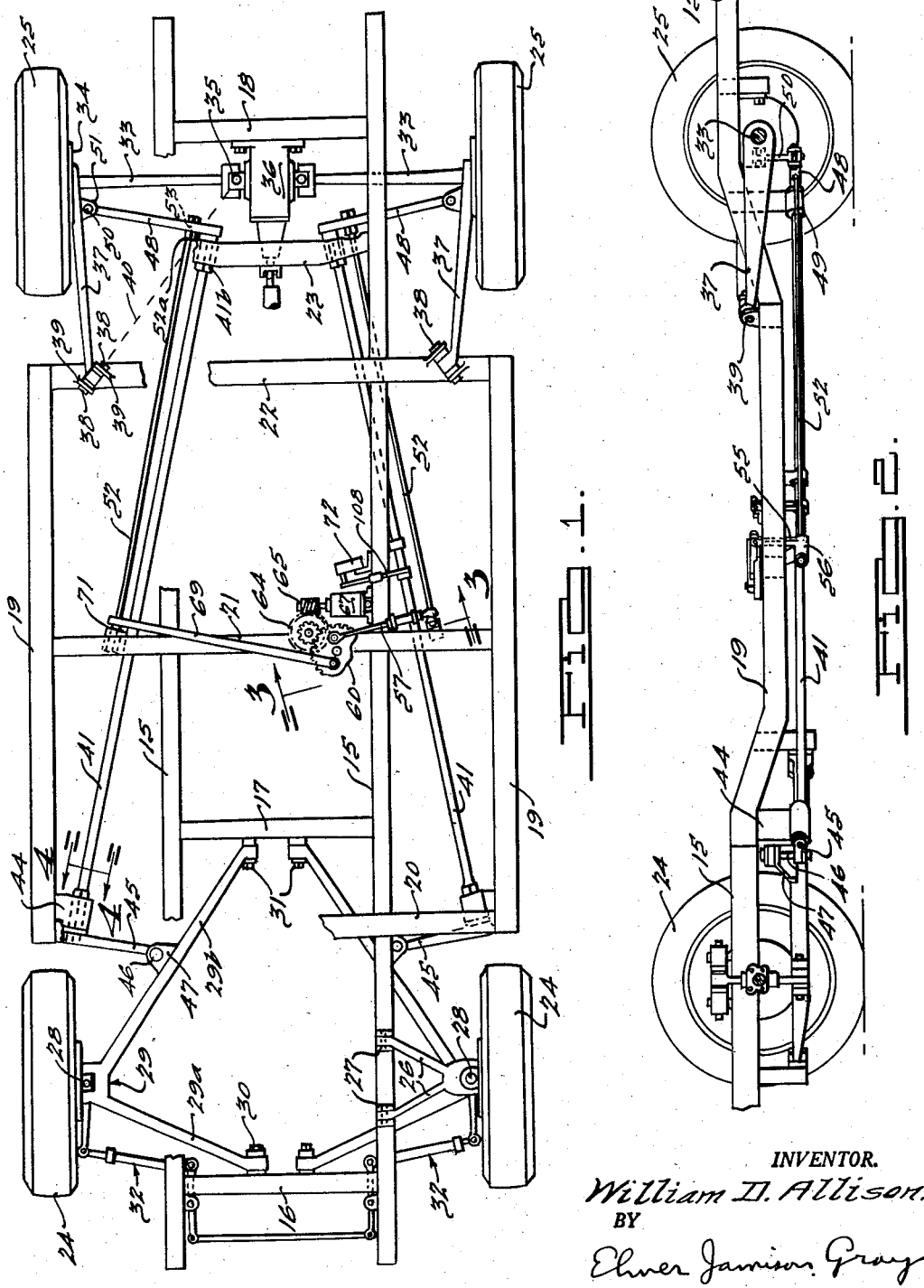

Sept. 23, 1958 W. D. ALLISON 2,853,310
LOAD COMPENSATING SPRING SUSPENSION FOR MOTOR VEHICLES
Filed March 1, 1954 3 Sheets-Sheet 3
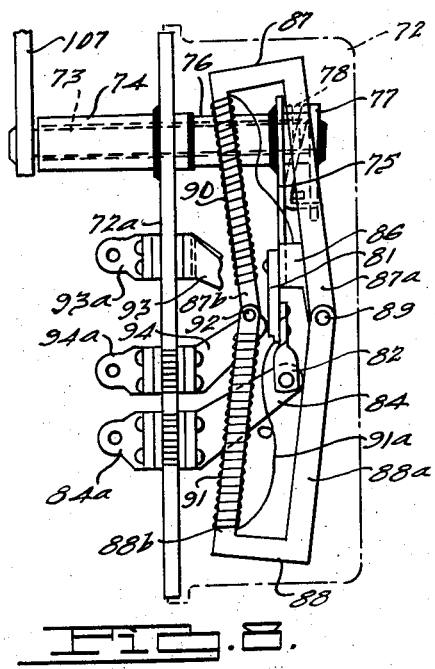
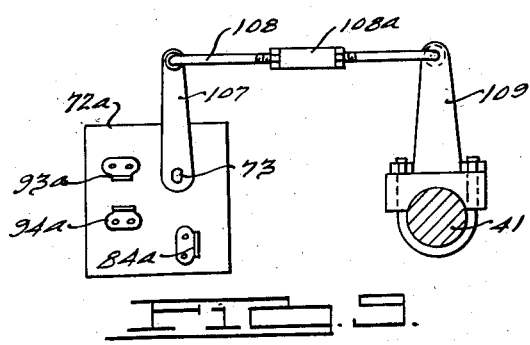
INVENTOR.
William D. Allison
BY
Elmer Jamison Gray
ATTORNEY.

United States Patent Office 2,853,310
Patented Sept. 23, 1958

2,853,310

LOAD COMPENSATING SPRING SUSPENSION FOR MOTOR VEHICLES

William D. Allison, Grosse Pointe, Mich.

Application March 1, 1954, Serial No. 413,253

14 Claims. (Cl. 280—124)

This invention relates to motor vehicles and particularly to spring suspensions therefor. The invention is applicable to various types of motor vehicles such as automobiles of the so-called pleasure or passenger types, busses, trucks, ambulances and commercial vehicles. For the purposes of illustration the invention has been shown herein as embodied in a motor vehicle having a chassis or frame structure adapted to be utilized in a passenger or pleasure type vehicle.

One of the principal objects of the invention is to provide a spring suspension for a motor vehicle capable of providing smooth riding characteristics under various conditions of vehicle operation, maintaining the vehicle substantially level at all times, increasing the comfort of the passengers regardless of rough roads over which the vehicle may travel, and rendering the vehicle relatively safe to handle on curves and over rough terrain while also reducing materially stresses and strains to which the frame is subjected under operating conditions.

In the illustrated embodiment the spring suspension embodies a main spring means, preferably torsion bar or torsional spring means, connecting a front and a rear wheel of the vehicle in such manner as to enable vertical forces to be transmitted in corresponding directions to the vehicle frame adjacent opposite ends thereof in response to vertical motion of either wheel. In addition to the foregoing the spring suspension embodies compensating means, which may be spring means of the torsional kind, operable to supplement or modify the spring effort or resistance of the main spring means so as to levelize the frame under conditions where an increase in static load is placed at one or either end of the vehicle. In the use of a main spring suspension common to the front and rear wheels and operable as above described a change in static load adjacent the rear or front of the vehicle has the effect of varying the riding height in opposite directions of the front and rear, thus putting the frame or vehicle out of level. The compensating means, one form of which is incorporated in the illustrated embodiment, functions under such conditions to restore the frame or vehicle to substantially a level position. A substantially uniform riding height of the vehicle body may thus be assured regardless of varying loads carried thereby.

In the embodiment herein illustrated the front wheels of the vehicle are supported for independent up and down movements by means of upper and lower swinging suspension arms or levers. Although the rear wheels are shown as supported by means of swing axles for independent vertical movement it will be understood that they may be otherwise supported, such as though the medium of a solid axle or upper and lower swinging suspension arms or levers for each rear wheel. The main spring suspension which is shown as comprising torsional spring means for each pair of front and rear wheels at a side of the vehicle, is connected to the front and rear wheels by means of swinging levers or lever arms. The torsional spring means common to a front and a rear wheel comprises a torsion bar extending longitudinally of the vehicle. One feature of the invention resides in connecting the forward end of the main torsion bar to the lower front wheel suspension arm independently of the pivotal axis thereof, i. e. the pivotal connection thereof to the frame. This is accomplished by connecting the forward end of the main torsion bar to the front wheel lower suspension arm at a point spaced from the axis of the latter through the medium of a lever arm which, being responsive to swinging motion of the suspension arm, is effective to torsionally deflect the main torsion bar in response to such motion. By virtue of this construction the angle of the main torsion bar, the length thereof, and the location of the connection of the forward end thereof to the frame may be determined without regard to the pivotal connection or connections of the front wheel lower suspension arm to the frame and likewise the pivotal axis of the latter and any desired angularity thereof are not dependent upon the direction, position or terminus of the main torsion bar.

The load compensating means incorporated in the illustrated embodiment preferably comprises a torsional spring or torsion bar supplementing or capable of modifying the effective effort of each main torsion bar. The compensating springs, as shown, may be connected to the rear wheel lever arms which are also connected to the main torsion bars. These compensating springs may be torsionally deflected as the result of static load changes on the vehicle so as to levelize the vehicle, this being accomplished in the present embodiment through the medium of variable leverage mechanism which is preferably power operated, such as by means of an electric servo-motor. Actuation of the motor is preferably performed automatically in response to static load changes occurring after a predetermined elapsed interval of time. Delayed action electrically controlled switch means is utlized in the present instance to control operation of the compensating motor in either direction, and when so operated the compensating springs will be torsionally deflected in one direction or the other through the variable lever mechanism.

An important feature of the invention is to provide for more accurate and precise leveling of the vehicle consequent to variations in static load applied to the front or rear of the vehicle or in different amounts to both front and rear. Heretofore, the delayed action switch was operated directly from a part of the vehicle through mechanical means. I have discovered, however, that more effective and accurate leveling of the vehicle under various conditions may be achieved by controlling the delayed action switch for the power operated compensating means from one of the main torsion bars of the spring suspension. For example, a lever arm may be atttached to the main torsion bar and adapted to be swung to actuate the switch upon torsional deflection of the bar at the point of connection of the lever arm thereto. For the location of this point of connection I prefer to select what may be termed the neutral point of the torsion bar or a point close thereto. This neutral point may be defined as the point intermediate the length of the bar at which the bar is subject to no torsional rotation or angular deflection relative to the frame or no appreciable torsional rotation when, even though a change in level of the vehicle may occur, there occurs no relative change in elevation of the front and rear thereof. As an example, if a load is placed at the rear of the vehicle, the rear end will then be depressed. This will result in causing the lever arm attached to the rear of the main torsion bar to torsionally deflect angularly, i. e. rotate or twist the bar angularly in one direction the full length thereof. It may be noted that a similar action takes place when a change in elevation of one wheel at one end of the vehicle occurs relative to the wheel at the opposite end.

When the main torsion bar is torsionally deflected, i. e. rotated in one angular direction, the switch operated arm attached to the bar will be swung in response to the torsional angular deflection or turning thereof and will actuate the switch. The actuation of the switch will, after a predetermined delay or interval of time, result in actuation of the compensating motor and cause the compensating mechanism to torsionally deflect the load compensating torsion bars. On the other hand, any change in elevation of the frame without any tilting thereof so as to place it out of level will result in the lever arms torsionally deflecting the ends of the torsion bar in opposite directions. A point called the neutral point will be found on the bar where no appreciable angular deflection, i. e. rotation occurs and, hence, if the switch operating arm is attached to the bar at or adjacent this neutral point the switch operating arm will not be swung sufficiently to actuate the switch.

From the foregoing construction it will be seen that control of the operation of the load compensating mechanism is derived from one of the main torsion bars and it has been found as a result of this construction that very close and accurate leveling of the vehicle may be achieved at all times since the compensating mechanism will be highly sensitive to various conditions in which the vehicle is out of level due to changes in or distribution of static loads.

Other objects of this invention will appear in the following description and appended claims, reference being had to the accompanying drawings forming a part of this specification wherein like reference characters designate corresponding parts in the several views.

Fig. 1 is a fragmentary plan view of a motor vehicle chassis provided with a vehicle spring suspension constructed in accordance with the present invention.

Fig. 2 is an enlarged fragmentary side elevation of the construction shown in Fig. 1 with the wheels at one side of the vehicle omitted.

Fig. 3 is an enlarged fragmentary sectional elevation taken substantially through lines 3—3 of Fig. 1 looking in the direction of the arrows.

Fig. 4 is an enlarged fragmentary sectional elevation taken substantially through lines 4—4 of Fig. 1 looking in the direction of the arrows.

Fig. 5 is an enlarged fragmentary plan view of the load compensator mechanism.

Figs. 6 and 7 are front elevations of the compensating switch mechanism illustrating two positions of the parts.

Fig. 8 is a side elevation of the compensating switch mechanism.

Fig. 9 is a view in elevation illustrating the main torsion bar control for the compensating switch mechanism.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the pharseology or terminology employed herein is for the purpose of description and not of limitation.

Referring to the accompanying drawings, there is illustrated, by way of example, a vehicle chassis having road wheels supporting the frame or body through the medium of a spring suspension which in the present embodiment is preferably of the torsional or torsion bar kind. In the interest of clarity the vehicle superstructure or body and details of the power plant and driven mechanisms have been largely omitted from the drawings.

As illustrated, the chassis or body frame is shown, by way of example, as comprising spaced longitudinal sills or main frame members 15 of box-like tubular construction rigidly connected together by means of suitable cross frame members 16, 17, 18 and 23. In the present instance the chassis also comprises longitudinal outrigger frame members 19 disposed between the front and rear wheels and joined together by means of cross frame members 20, 21 and 22 which are rigidly attached to the main frame members 15. The illustrated frame construction is particularly useful for an automobile having a unitary body and frame structure wherein, for example, the front upright body pillars are attached at their lower ends to the junctures of the frame members 19 and 20. The vehicle is provided with a pair of front dirigible wheels 24 and a pair of rear driven wheels 25.

Each front wheel 24 is supported for independent up and down movement according to conventional practice by means of upper and lower swinging suspension arms or levers which are preferably of wishbone or fork-like construction. The upper relatively short suspension arms are indicated at 26 and each is pivoted at longitudinally spaced points 27 to suitable brackets on one of the main frame members 15. The outer end of each upper suspension arm or lever 26 is pivotally connected to a spindle and king pin mounting 28 of suitable type. The relatively long lower suspension arm or lever for each front wheel 24 is indicated at 29 and in the present instance comprises wide angle diverging spaced arms or fork members 29a and 29b. The inner end of the front arm member 29a of each lower suspension arm is pivoted at 30 to the cross frame member 16 and the inner end of the rear arm member 29b is pivoted at 31 to the cross frame member 17. The outer converging ends of the arm members 29a and 29b are joined together and are pivotally connected to the adjacent spindle and king pin mounting 28.

Steering control is provided at the front wheels 24 through the spindle and king pin mountings or carriers 28 by any conventional type of steering mechanism, such as that generally illustrated, by way of example, at 32 in Fig. 1.

Although it will be understood that the rear driven wheels 25 may be supported in any conventional manner for up and down motion, in the present instance these wheels are supported through the medium of swinging half axle or driven shaft members 33. Each axle or shaft member 33 for a rear wheel 25 has a rotative bearing at its outer end in a rigid non-rotative wheel support 34. The inner end of each driven axle shaft 33 is connected by a universal joint 35 to a bracket rigidly secured to the side of the differential housing 36 which is carried by the cross frame members 18 and 23. As in conventional practice, the differential mechanism is operated from the propeller shaft of the vehicle and in the present instance the differential mechanism drives the axle shafts 33 which in turn are drivingly connected to the wheels 25. Each rear wheel 25 is also supported for independent vertical motion through the medium of a torque arm 37 the rear end of which is rigidly attached to the wheel support 34. Each torque arm 37 extends forwardly from the wheel and also inclines upwardly and the forward end thereof is pivoted at 38 to a bracket 39 attached to the cross frame member 22. The pivotal axis at 38 of the forward end of each torque arm 37 extends obliquely and inclines to a suitable degree rearwardly and downwardly as indicated by the broken line 40 and passes through the pivotal axis of swinging at 35 of the associated swing axle shaft 33. From the foregoing it will be seen that each rear wheel 25 in the present embodiment will be effectively controlled for a vertical motion by a swing axle shaft 33 and torque arm 37 and will swing up and down about the oblique inclined axis 40.

The main spring suspension for the vehicle comprises a longitudinal torsion bar 41 connected to the front and rear wheels 24 and 25 at each side of the vehicle. The main torsion bars 41 may, as desired, be of solid or tubular construction and when installed are initially stressed by winding or twisting them angularly a predetermined amount up to, for example, eighty to ninety degrees so as to support the sprung weight of the vehicle. As illustrated in Figs. 1 and 4, the forward ends of the main torsion bars 41 terminate proximate to the junctures of the frame members 19 and 20. The forward end of each main torsion bar is upset to provide an enlarged hex portion 41a splined or keyed within a correspondingly shaped socket or sleeve 42 rotatable within a bearing 43 in a bracket 44 attached to and depending from the adjacent longitudinal frame member 19. Thus, the forward end of each main torsion bar is rotatably supported within a frame bracket 44 and the enlarged hex end of the torsion bar porjects through the bracket and is keyed or anchored in a correspondingly shaped socket in the outer end of a swinging lever arm 45. This lever arm for each main torsion bar, as shown in Fig. 2, is connected at its inner end to the lower end of a hanger link or rod 46 and the upper end of the rod is connected to a bracket 47 rigidly secured at an intermediate point to the arm member 29b of the adjacent lower suspension arm 29. The connections at opposite ends of the rod or link 46 may be articulated or may embody rubber or resilient material to provide for the required amount of flexibility at these points. It will be understood that upward vertical motion of a front wheel will be transmitted by the lower suspension arm member 29b through the link 46 to the inner end of the lever arm 45 thereby swinging this lever arm in an upward direction and causing the outer end of the lever arm to rotate or torsionally deflect angularly the torsion bar 41 to which it is attached. Due to the restoring action of the spring torsion bar, which at all times is under torsional stress, the inner end of the lever arm 45 will swing downwardly when the front wheel is displaced in a downward direction, this downward motion of the inner end of the lever arm at its connection with the link 46 being accompanied by corresponding motion of this link and the lower suspension arm member 29b.

The rear ends of the main torsion bars 41 are also upset to provide enlarged hex end portions 41b which extend through the lower ends of hanger brackets 49 carried by the cross frame member 23. These rear hex ends 41b of the main torsion bars have rotatable bearings within the brackets 49 similarly to the forward ends of the torsion bars, as shown in Fig. 4. These hex ends 41b are anchored or keyed rigidly within correspondingly shaped sockets in the inner ends of swinging lever arms 48. The outer end of each lever arm 48 has an interlocking connection with the lower end of a vertical link or rod 50, the upper end of which is connected to a bracket 51 attached to the wheel support 34. The connections between the outer ends of the lever arms 48 and the brackets 51 are similar to the connections between the inner ends of the front lever arms 45 and the brackets 47. Similarly, the connections at opposite ends of the links or rods 50 with the lever arms 48 and brackets 51 are articulated or resilient so as to provide for the required amount of flexibility at these points. Vertical motion of each rear wheel 25 and swing axle shaft 33 will swing the associated lever arm 48, and this operation will result in torsionally deflecting angularly or twisting the rear end of the torsion bar 41, this angular motion of the rear end of the torsion bar, as in the case of the front end thereof, being permitted by reason of the rotative bearing of the end of each torsion bar in the hanger bracket 49.

It will be noted that the swinging lever arms 45 and 48 attached to the front and rear ends of each main torsion bar 41 extend in opposite or opposed directions inwardly and outwardly respectively from the main torsion bar. Hence, it will be understood that these lever arms will torsionally deflect angularly or twist the torsion bar 41 in opposite directions in response to corresponding vertical motions of the front and rear wheels. In other words, up and down movement of a front wheel or a rear wheel will result in angular torsional deflection of the main torsion bar 41 in directions opposite to the angular torsional deflection thereof produced by corresponding up and down movement of the other wheel at the same side of the vehicle. As a consequence, either arm or lever 45 or 48 is effective to torsionally deflect angularly the torsion bar 41 in opposition to the other arm or lever, thereby to transmit vertical forces in corresponding directions to the frame adjacent opposite ends thereof in response to vertical motion of either wheel. Hence, when a rear wheel 25, for example, is displaced upwardly, thereby tending to elevate the rear end of the frame, the rear end of the bar 41 will be twisted or torsionally deflected angularly in a direction so as to exert a force through lever arm 45 tending to swing the front suspension arm 29 downwardly and depress the front wheel. Since the outer end of the suspension arm 29 is held against downward movement by the front wheel the net result is to raise the front end of the frame in a direction corresponding to the direction in which the rear end of the frame is raised by the upward movement of the rear wheel. The corresponding vertical displacements of the front and rear of the frame thus result in maintaining the frame substantially level. The reverse operation occurs when a front wheel is displaced vertically relatively to the rear wheel at the same side of the vehicle.

From the foregoing it will be seen that both front and rear ends of each torsion bar spring 41 will be simultaneously turned or deflected angularly substantially in corresponding amounts when the front and rear wheels successively pass over a change in elevation, resulting in substantially equivalent vertical movements in the same directions being transmitted to opposite ends of the vehicle body and chassis. The main torsion bar spring suspension including the torsion bars 41 and opposed lever arms 45 and 48, therefore, simultaneously imparts vertical forces in corresponding directions adjacent the front and rear of the vehicle body or frame in response to vertical motion of either a front wheel or a rear wheel. As a consequence, the spring suspension will be effective to maintain the chassis and vehicle body substantially level regardless of vertical movements of the front and rear wheels. Of course, it will be understood that when the front and rear wheels are simultaneously elevated or lowered both ends of the vehicle chassis and body will be raised or lowered substantially equal distances. It is important to note that the total vertical forces due to a change in elevation of either a front or a rear wheel at one side of the vehicle is absorbed and divided equally between the front and rear of the interconnecting torsion bar 41. This results in providing an average spring rate of the present spring suspension which will be approximately one-half the spring rate of a conventional automobile.

It will be observed that the main torsion bars 41 diverge outwardly from the rear toward the front of the vehicle and that vertical forces from these springs are applied to the strong points of the frame and body at the localities of the front corner body pillars where the frame members 19 and 20 are joined together. Advantage is, therefore, taken of these strong points in applying vertical forces of the forward ends of the spring torsion bars. In addition, by virtue of the rear lever arms 48 extending outwardly from the torsion bars to the rear wheels and the forward divergence of the torsion bars, the present spring suspension affords greater stability for the vehicle and greater resistance to body roll. A further important feature of the spring suspension resides in the connections of the forward ends of the main torsion bars to the lower swinging suspension arms 29 independently of the pivotal connections 30 and 31 thereof to the frame. The axis of swinging, therefore, of the inner ends of each lower suspension arm may be determined without regard to the main torsion bar. The construction furthermore permits the use of a lower suspension arm having wide angle fork members 29a and 29b and the forward end of the main torsion bar may be controlled from the lower suspension arm independently of the location of the pivot 31 through the medium of a swinging lever arm 45 connected to the long arm 29b at a suitable point intermediate the ends thereof.

In the present embodiment of the invention the main spring suspension comprising the torsion bars 41 is supplemented by compensating means, preferably spring means of the torsional kind, at each side of the vehicle operable to vary or modify the spring effort or resistance of the main spring means so as to maintain the frame substantially level under conditions where changes in static load occur at one end or the other of the vehicle. In the present instance the compensating means is provided at the rear of the vehicle and comprises a torsion bar 52 for each rear wheel. The spring torsion bars 52, as in the case of the main torsion bars 41, are selected as to cross-sectional size and torsional characteristics to suit the particular vehicle, each compensating torsion bar being preferably of less diameter or cross-sectional size than the associated main torsion bar since normally it is only required to exert appreciably less torsional resistance than the associated main torsion bar. The compensating torsion bars for the rear wheels function to increase and decrease the spring resistance at the rear wheels so as to maintain the front and rear of the frame at substantially a constant level. In preferred practice the compensating torsional spring means may be torsionally deflected in one direction to supplement the main torsional spring means and increase the torsional effort or spring resistance applied to the rear wheels or may be deflected in the opposite direction either to decrease the spring resistance at the rear wheels or reduce the torsional effort exerted by the main torsional spring means. Where desired it will be understood that the compensating spring means may be duplicated for the front wheels and operated in the same manner as hereinafter described.

In the present embodiment each compensating torsion bar 52 extends parallel to and alongside the associated main torsion bar 41 and the rear end is upset to provide an enlarged hex portion 52a keyed or rigidly secured at 53 within a correspondingly shaped socket adjacent the inner end of the lever arm 48. The forward end of each compensating bar 52 is provided with a similar enlarged hex portion keyed or rigidly secured within a hex socket 54 in the lower end of a vertical lever 55. Each bar 52 extends through the lower end of the lever 55 and has a rotatable bearing in a bracket 56 secured to the cross frame member 21. A longitudinally adjustable link 57 is connected at its outer end to the upper end of the lever 55 (Figs. 3 and 5). The link 57 has an articulated connection at 58 with the lever 55. The inner end of the link 57 is pivotally connected at 59 to a sector gear 60 journalled at 61 on a bracket 62 bolted to the cross frame member 21. The pivotal connection 59, as seen in Fig. 5, is spaced a suitable distance at one side of the pivotal mounting 61 of the sector gear 60. This gear meshes with a pinion 63 carried by the bracket 62, this pinion being fixed to a large worm gear 64 which in turn meshes with a worm 65 carried by the armature shaft 66 of an electric servo-motor 67. This motor is carried by a bracket 68 bolted to the side of one of the main frame members 15. A second transmitting link 69 is pivoted at 70 to the sector gear 60, the pivotal connection thereof, as seen in Fig. 5, being spaced from the pivot 61 of the gear at the side thereof opposite to the pivotal connection 59. The outer end of the link 69 has an articulated connection at 71 to the upper end of a lever, identical to the lever 55, which is attached at its lower end to the associated compensating torsion bar. It will thus be understood that the connections between the outer ends of the transmitting links 57 and 69 to the compensating torsion bars 52 are identical and through the medium of swinging levers 55 as shown in Figs. 3 and 5. In the present instance the reduction gearing connected to the inner ends of the links 57 and 69 is arranged at one side to the longitudinal center line of the frame so as to provide clearance for the driven or propeller shaft of the vehicle.

In the illustrated construction, referring to Figs. 3 and 5, it will be seen that each vertical lever 55 is approximately twice the length of each of the effective lever arms measured from the pivot 61 of the gear 60 to each pivotal connection 59 and 70 of the links 57 and 69 to the gear sector. By virtue of this construction together with the locations of the pivots 59 and 70 with respect to the pivotal axis of the sector gear 60, a substantial mechanical advantage is gained in torsionally deflecting angularly the compensating torsion bars 52 upon operation of the electric servo-motor 67. Assuming that the torsion bars 52 are in unstressed condition when the levers 55 extend in a true vertical direction as shown in full lines in Fig. 3, it will be seen that the effective leverage effort exerted by the transmitting links 57 and 69 at the upper ends of the levers 55 increases materially as the resistance to angular torsional deflection of the torsion bars 52 increases. Thus, in torsionally deflecting the compensating bars 52 in one direction or the other by swinging the actuating levers 55 to one or the other of their maximum positions shown in broken lines in Fig. 3, a variable leverage effort is produced having a substantially increased mechanical advantage. As a result of this feature the size of the reduction gearing and the servo-motor 67 necessary to operate the compensating torsion bars 52 may be materially reduced. Although reduction gearing 60, 63, 64 and 65 is herein shown interposed between the compensating motor and the transmitting links 57 and 69, it will be understood that any other suitable and known kind of reduction gearing may be utilized in lieu of the reduction gearing shown.

The compensating motor 67 for simultaneously varying the angular deflection of the compensating torsional springs 52, thereby to set them at the desired angular adjustments to increase or decrease the spring resistance at one end of the frame and compensate for changes in static loads so as to maintain the frame level, is actuated in one direction or the other through delayed action compensator switch mechanism contained in a suitable casing 72, see Figs. 6 to 8. This casing comprises, in addition to a suitable cover, a back wall 72a. A rock shaft 73 extends through this back wall and is carried by a fixed bearing sleeve 74 attached to the wall. A depending conducting carrier plate 75 is attached to the inner end of a sleeve 76 which is loose on the inner end of the rock shaft 73. A transmitting lever 77 is fixed to the inner end of the rock shaft 73. Coiled around the inner end of the sleeve 76 is a transmitting spring 78 having depending spring arms engageable selectively by a depending arm of the lever 77 upon turning the rock shaft in one direction or the other. Turning motion of the rock shaft 73 is yieldingly transmitted by the swingable lever 77 to the carrier plate 75 through the spring 78, one or the other of the depending spring arms of which is adapted to engage a lug 79 on the carrier plate to swing the same in one direction or the other as shown in Figs. 6 and 7.

The carrier plate 75, which forms an electrical conductor, is grounded to the casing 72 by a wire 80. Riveted to the lower end of the carrier 75 is an insulating or non-conducting piece 81 to which are riveted a pair of spaced depending contact arms or elements 82 and 83 having electrical contacts at their lower ends. Interposed between the movable contacts 82 and 83 is a fixed contact arm 84 attached to the casing wall 72a and terminating in a double contact engageable selectively by the contacts 82 and 83 upon swinging the carrier plate 75 in one direction or the other. The contact 84 is electrically connected to a terminal 84a on the outside of the wall 72a, this terminal being insulated from the wall and electrically connected to the car battery through a conductor line.

The carrier plate 75 is formed with a bracket flange 86. Adjacent this flange is a pair of similar horseshoe-like bimetallic elements 87 and 88. Arms 87a and 88a of these elements overlap at their adjacent ends, see Fig. 8, and are riveted at 89 to the lower end of the bracket flange 86. By this construction the bimetallic elements are carried by the carrier plate 75 and swing back and forth therewith in response to turning motion of the rock shaft 73 in one direction or the other. The bimetallic elements also include arms 87b and 88b. Insulated electrical resistance wires 90 and 91 are wound around the arms 87b and 88b respectively. The bimetallic elements are temperature compensated by virtue of their horseshoe shape whereby contacts 92 are not subject to appreciable displacement under changes in ambient temperature. The adjacent ends of the arms 87b and 88b are overlapped and carry contact rivets or terminals 92 the inner ends of which abut or are proximate to each other. The inner ends of the resistance wires 90 and 91 adjacent the contacts 92 are bared and soldered to the arms. The opposite outer ends of the resistance wires form continuations of conductor wires 90a and 91a respectively. The end of the wire 90a is connected to the contact 83 and the wire 91a is connected to the contact 82. Secured to the casing wall at opposite sides of the movable contacts 92 carried by the bimetallic elements are fixed contact members 93 and 94 which in turn are electrically connected to terminals 93a and 94a respectively mounted on the outer side of the casing wall 72a and insulated therefrom.

Attached to the outer end of the rock shaft 73, see Figs. 8 and 9, is a vertical lever arm 107 to the upper end of which is pivoted a horizontally extending link 108 provided with turnbuckle adjusting means 108a to enable the length of the link to be adjusted. The outer end of this link is pivotally connected to the upper end of a lever arm 109 which is rigidly attached at its lower end to one of the main torsion bars 41. The connection of the lever 109 to the main torsion bar is preferably located at or close to the neutral point of the bar, this neutral point being hereinabove described.

In the operation of the compensator switch it will be understood that rock shaft 73 will be turned in one direction or the other through lever 107, link 108 and lever 109 (Fig. 9) when the main torsion bar 41 is angularly deflected or twisted in one direction or the other due to a change in elevation of one end or the other of the vehicle frame. Turning of the rock shaft 73 in one direction, as shown in Fig. 6, will swing the carrier plate 75 and engage contacts 82 and 84 causing current to flow from the battery through line 91a and resistance winding 91 and thence through plate 75 and wire 80 to ground. This movement of the carrier plate swings the bimetallic elements and brings contact 92 into close proximity to contact 94, but spaced therefrom. Arm 88b of the bimetallic member 88 is heated by the resistance wire 91 which results in gradually bending or deflecting the arm, as shown in broken lines in Fig. 6, until contact 92 engages contact 94. When this occurs the circuit from the battery is completed thereby operating the motor in one direction and driving the reduction gearing 60, 63, 64 and 65 to shift the transmitting links 57 and 69 to torsionally deflect angularly the compensating torsion bars 52.

Referring to Fig. 7, turning of the rock shaft 73 in the direction opposite to that shown in Fig. 6 will swing the carrier plate 75 and cause contact 83 to engage contact 84. This results in connecting the battery line through line 90a to resistance wire 90 and thence through plate 75 and wire 80 to ground. Swinging of plate 75, as shown in Fig. 7, moves contact 92 into close proximity to contact 93, but spaced therefrom. As the resistance winding 90 is heated it deflects or bends the arm 87b of the bimetallic element and after a predetermined interval of time brings contact 92 into engagement with contact 93. It will be understood that the construction of the bimetallic elements is such that engagement of contact 92 with either contact 93 or contact 94 will be effected only after a predetermined delayed interval of time. Upon contact being made between contact elements 92 and 93 the circuit from the battery is completed thereby operating the motor in a direction opposite to the direction of operation resulting from that described in connection with Fig. 6.

From the foregoing it will be seen that the compensator switch will provide accurately and effectively a predetermined interval of delay in the operation of the compensating motor so as to render the motor responsive to changes in static load on the frame occurring over a period of time at least as long as the interval of delay in the switch operation. This prevents operation of the motor during travel of the vehicle when passing over changes of elevation resulting in torsionally deflecting the main torsion bars and engaging one or the other of the main contacts 82 and 83 with the contact 84. It is necessary not only to effect contact at 84 but also after a delayed interval of time to effect contact through the bimetallic elements at 93 or 94 before the motor will be operated. At any time that the control arm 107 is restored to its neutral position the plate 75 will also be restored to neutral position thereby breaking contact at 84 and stopping the motor.

I claim:

1. In a vehicle having a vehicle structure and front and rear wheels, torsion bar spring means extending longitudinally of the vehicle structure and operatively connected adjacent the front and rear ends thereof to said wheels, compensating yieldable means effective to supplement or modify the effort of said spring means to compensate for changes in static load on said structure, actuating means for varying the compensating effort of said yieldable means, control means for controlling the operation of said actuating means and including a member having a connection to said torsion bar spring means at a locality intermediate said front and rear ends and movable in response to predetermined torsional deflection thereof.

2. In a vehicle having a vehicle structure and front and rear wheels, torsion bar spring means extending longitudinally of the vehicle structure and operatively connected adjacent the front and rear ends thereof to said wheels, compensating yieldable means effective to supplement or modify the effort of said spring means to compensate for changes in static load on said structure, actuating means for varying the compensating effort of said yieldable means, control means for controlling the operation of said actuating means and including a member having a connection to said torsion bar spring means and movable in response to predetermined torsional deflection thereof, said connection being disposed at a locality nearer to the longitudinal center of the torsion bar spring means than to either of said front and rear ends thereof.

3. In a vehicle having a vehicle structure and front and rear wheels, torsion bar spring means extending longitudinally of the vehicle structure and operatively connected adjacent the front and rear ends thereof to said wheels, compensating yieldable means effective to supplement or modify the effort of said spring means to compensate for changes in static load on said structure, actuating means for varying the compensating effort of said yieldable means, control means for controlling the operation of said actuating means and including delayed action means and a device adapted to be shifted into position to operate said delayed action means, said control means also including a member having a connection to said torsion bar spring means at a locality intermediate said front and rear ends and movable in response to predetermined torsional deflection thereof for shifting said device.

4. In a vehicle having a vehicle structure and front and rear wheels, torsion bar spring means extending longitudinally of the vehicle structure and operatively connected adjacent the front and rear ends thereof to said wheels, compensating yieldable means effective to supplement or modify the effort of said spring means to compensate for changes in static load on said structure, actuating means for varying the compensating effort of said yieldable means, control means for controlling the operation of said actuating means and including delayed action means and a device adapted to be shifted into position to operate said delayed action means, said control means also including a member having a connection to said torsion bar spring means and movable in response to predetermined torsional deflection thereof for shifting said device, said connection being disposed at a locality nearer to the longitudinal center of the torsion bar spring means than to either of said front and rear ends thereof.

5. In a vehicle having a vehicle structure and front and rear wheels, torsion bar spring means extending longitudinally of the vehicle structure and operatively connected adjacent the front and rear ends thereof to said wheels, compensating yieldable means effective to supplement or modify the effort of said spring means to compensate for changes in static load on said structure, power actuating means for varying the compensating effort of said yieldable means, control means for controlling the operation of said actuating means and including a lever arm secured to said torsion bar spring means at a locality intermediate said front and rear ends and swingable in either one direction or the other in response to predetermined torsional deflection thereof.

6. In a vehicle having a vehicle structure and front and rear wheels, torsion bar spring means extending longitudinally of the vehicle structure and operatively connected adjacent the front and rear ends thereof to said wheels, compensating yieldable means effective to supplement or modify the effort of said spring means to compensate for changes in static load on said structure, power actuating means for varying the compensating effort of said yieldable means, control means for controlling the operation of said actuating means and including a lever arm secured to said torsion bar spring means at a locality intermediate said front and rear ends and swingable in either one direction or the other in response to predetermined torsional deflection thereof, said locality being nearer to the longitudinal center of the torsion bar spring means than to either of said front and rear ends thereof.

7. In a vehicle having a vehicle structure and front and rear wheels, torsion bar spring means extending longitudinally of the vehicle structure and operatively connected adjacent the front and rear ends thereof to said wheels, compensating yieldable means effective to supplement or modify the effort of said spring means to compensate for changes in static load on said structure, actuating means for varying the compensating effort of said yieldable means, control means for controlling the operation of said actuating means and including a member having a connection to said torsion bar spring means at a locality intermediate said front and rear ends and movable in response to predetermined torsional deflection thereof, said locality being at or adjacent the neutral point of said spring means.

8. In a vehicle having a vehicle structure and front and rear wheels, torsion bar spring means extending longitudinally of the vehicle structure and operatively connected adjacent the front and rear ends thereof to said wheels, compensating yieldable means effective to supplement or modify the effort of said spring means to compensate for changes in static load on said structure, actuating means for varying the compensating effort of said yieldable means, control means for controlling the operation of said actuating means and including delayed action means and a device adapted to be shifted into position to operate said delayed action means, said control means also including a member having a connection to said torsion bar spring means at a locality intermediate said front and rear ends and movable in response to predetermined torsional deflection thereof for shifting said device, said locality being at or adjacent the neutral point of said spring means.

9. In a vehicle having a vehicle structure and front and rear wheels, torsion bar spring means extending longitudinally of the vehicle structure and operatively connected adjacent the front and rear ends thereof to said wheels, compensating yieldable means effective to supplement or modify the effort of said spring means to compensate for changes in static load on said structure, power actuating means for varying the compensating effort of said yieldable means, control means for controlling the operation of said actuating means and including a lever arm secured to said torsion bar spring means at a locality intermediate said front and rear ends and swingable in either one direction or the other in response to predetermined torsional deflection thereof, said locality being at or adjacent the neutral point of said spring means.

10. In a vehicle having a vehicle structure and front and rear wheels, torsion bar spring means extending longitudinally of the vehicle structure and operatively connected adjacent the front and rear ends thereof to said wheels, compensating yieldable means effective to supplement or modify the effort of said spring means to compensate for changes in static load on said structure, power actuating means for varying the compensating effort of said yieldable means, control means for controlling the operation of said actuating means and including a lever arm secured to said torsion bar spring means at or adjacent its neutral point intermediate said front and rear ends thereof.

11. A spring suspension according to claim 1 wherein variable leverage means is connected to said compensating yieldable means for deflecting the same and having increasing effective leverage effort during deflection of said compensating yieldable means.

12. In a spring suspension for a vehicle having front and rear wheels, a main spring means connected to said wheels, load compensating torsional spring means connected to one wheel independently of the other, power actuated means including a driven member rotatable about a pivotal axis, and a transmitting member pivotally connected to said member at one side of the pivotal axis thereof and connected to said torsional spring means for torsionally deflecting the same angularly upon operation of said power actuated means, the effective lever arm applied by said driven member to said transmitting member being shorter than the effective lever arm of said lever means.

13. In a spring suspension for a vehicle having a frame and pairs of front and rear wheels, spring means interposed between the frame and wheels, load compensating torsional spring means connected to each wheel of one of said pairs of wheels for supplementing or modifying the effort of said spring means thereby to levelize the frame, power actuated means, a driven member rotatably operated from said power actuated means, a pair of transmitting members pivotally connected to said driven member at opposite sides of the pivotal axis of rotation thereof and shiftable in opposite directions upon rotation of said driven member, lever means connecting each transmitting member to one of said torsional spring means and operative to torsionally deflect the same upon operation of said power actuated means, the effective lever arm applied by said driven member to the end of each transmitting member being shorter than the effective lever arm of said lever means.

14. A spring suspension according to claim 3 wherein variable leverage means is connected to said compensating yieldable means for deflecting the same and having increasing effective leverage effort during deflection of said compensating yieldable means.

(References on following page)

References Cited in the file of this patent

UNITED STATES PATENTS

| | | |
|---|---|---|
| 1,426,448 | Austin | Aug. 22, 1922 |
| 2,360,227 | Hemphill | Oct. 10, 1944 |
| 2,438,352 | Strong | Mar. 23, 1948 |
| 2,490,311 | Rostu | Dec. 6, 1949 |
| 2,512,055 | Dillon | June 20, 1950 |
| 2,555,649 | Krotz | June 5, 1951 |
| 2,607,611 | Allison | Aug. 19, 1952 |
| 2,621,057 | Oster | Dec. 9, 1952 |
| 2,687,311 | Nallinger | Aug. 24, 1954 |